United States Patent
Chiriku et al.

(10) Patent No.: US 6,610,926 B2
(45) Date of Patent: Aug. 26, 2003

(54) JUNCTION BOX

(75) Inventors: Akihiko Chiriku, Shizuoka-ken (JP); Norio Ito, Shizuoka-ken (JP); Hiroyuki Sasaki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/131,081

(22) Filed: Apr. 25, 2002

(65) Prior Publication Data

US 2002/0157852 A1 Oct. 31, 2002

(30) Foreign Application Priority Data

Apr. 27, 2001 (JP) ........................................ 2001-133521

(51) Int. Cl.$^7$ ................................................. H02G 3/18
(52) U.S. Cl. .......................... 174/60; 174/60; 174/59; 361/406; 361/395; 361/413; 333/12; 439/79; 363/21; 363/16; 363/20; 363/98; 363/132; 323/235; 323/319
(58) Field of Search ..................... 174/60, 59; 361/683, 361/406, 395, 413; 333/12; 439/79; 363/21, 16, 20, 98, 132; 323/235, 319

(56) References Cited

U.S. PATENT DOCUMENTS

| | | | | |
|---|---|---|---|---|
| 4,950,168 A | * | 8/1990 | Watanabe et al. | 439/34 |
| 5,655,927 A | * | 8/1997 | Maue et al. | 439/510 |
| 5,764,487 A | * | 6/1998 | Natsume | 174/72 B |
| 5,822,189 A | * | 10/1998 | Isshiki | 174/59 |
| 6,213,788 B1 | * | 4/2001 | Murakami | 439/76.2 |

OTHER PUBLICATIONS

U.S. patent application No. 10/132,261 by Akihiko Chiriku et al., filed on Apr. 26, 2002.

* cited by examiner

Primary Examiner—Dean A. Reichard
Assistant Examiner—Anton Harris
(74) Attorney, Agent, or Firm—Finnegan, Henderson, Farabow, Garrett, & Dunner, L.L.P.

(57) ABSTRACT

A junction box (10) is constituted by a junction box body (14), on which a fuse outlet (11e) is formed, and a casing (18) for housing the junction box body (14). The casing (18) is formed by a lower case (17) for housing the junction box body (14), and an upper case (16) for detachably covering a housing hole (17i) of the lower case (17). A cutaway portion for exposing the fuse outlet (11e) is formed on the lower case (17). Moreover, a closing portion (16d) for covering the cutaway portion is provided on the upper case (16).

9 Claims, 14 Drawing Sheets

JUNCTION BOX

BACKGROUND OF THE INVENTION

1. Field of the Invention

The present invention relates to a junction box, in which the junction box is capable of intensively connecting and distributing multiple wire harnesses when the wire harnesses are cabled in a vehicle or the like.

2. Description of the Related Art

In a junction box to be mounted on a vehicle, a junction box body is constituted as follows. Single-layer or multi-layer wiring boards each configured with a desired circuit by cabling bus bars and electric wires are stacked on a wiring plate. The wiring plate on which the wiring boards are stacked is covered with an upper cover and an under cover, thus constituting the junction box body generally. One type of junction boxes mounts a control substrate as an electronic controller unit on the wiring plate. The junction box body thus installed with the wiring plate and the control substrate is housed into a casing disposed in an engine room or the like upon installation in the vehicle. At this time, external electronic components such as relays, fuses and connectors are fitted on a front face of the junction box body.

The casing for housing the junction box body is divided into an upper case and a lower case. The junction box body is housed into the lower case in the state that the upper case is open. Then, a housing hole of the lower case is covered with the upper case. However, in a proposed junction box, the junction box has constituted in a manner that the major part of the junction box body is covered with the lower case in the state that the junction box body is housed in the lower case. The housing hole of the lower case is covered with the upper case, thereby preventing entrance of dust and the like into the casing.

The junction box is in the state that a fuse fitting portion provided on the junction box body is covered with the lower case. Therefore, upon changing the fuses, the upper case needs to be detached from the lower case and the housing hole needs to be opened. Then, the junction box body is extracted out of the housing hole, whereby the fuse fitting portion needs to be exposed.

However, in order to extract the junction box body out of the lower case, it is necessary to release a lock provided therebetween. Thus, an operation to release the lock is complicated. Further, the external connectors are fitted to the junction box body. Wire harnesses to be connected to the connectors are cabled intensively toward a direction of electrical components which are installed on a vehicle. However, the direction in which the wire harnesses are cabled varies according to the specification of a vehicle, such as right-hand drive or left-hand drive. Therefore, it is necessary to prepare various types of cases and deal with the specifications of vehicles by changing positions of extracting holes where wire harnesses are extracted in accordance with the specifications. Accordingly, manufacturing costs such as extra mould costs are accumulated.

SUMMARY OF THE INVENTION

It is an object of the present invention to provide a junction box that do not require extraction of a junction box out of a lower case, and facilitate changing fuses. It is another object of the present invention to provide a junction box that can cable wire harnesses for external connectors toward an arbitrary direction by use of one type of a case.

The first aspect of the present invention provides a junction box comprising: (a) a junction box body on which a fuse outlet is formed for fitting fuses, the junction box body comprising: an upper cover provided with an embedding stage for various external electronic components; an under cover to be fitted into the upper cover; a wiring plate disposed between the under cover and the upper cover; a wiring board disposed between the wiring plate and the upper cover, the wiring board being fixed to the wiring plate and stacked in multiple stages, and the wiring board having an insulating plate; and a control substrate including a substrate, the control substrate being fixed on the wiring plate, and (b) a casing for housing the junction box body, the casing comprising: a lower case for housing the junction box body; and an upper case for detachably covering a housing hole of the lower case, wherein a cutaway portion for exposing the fuse outlet is formed on the lower case, and a closing portion for covering the cutaway portion is provided on the upper case.

The second aspect of the present invention provides a junction box according to the first aspect of this invention, wherein a connector outlet for fitting an external connector is formed on the junction box body, and a free cabling hole for allowing an arbitrarily extracting direction of a wire harness connected to the connector is provided on the casing.

The third aspect of the present invention provides a junction box according to the first aspect of this invention, wherein the control board body comprises a terminal block, the terminal block is constituted of a first divided block and a second divided block, and adjacent ends of both the first divided block and the second divided block constitute a superimposed portion.

The fourth aspect of the present invention provides a junction box according to the third aspect of this invention, wherein the control board body further comprises a substrate connector, the substrate connector is provided independently of both the substrate and the terminal block.

The fifth aspect of the present invention provides a junction box according to the third aspect of this invention, wherein the terminal block is attached in substantially orthogonal to a plane direction of the insulating plate.

The sixth aspect of the present invention provides a junction box according to the fifth aspect of this invention, wherein the terminal block is fastened and fixed to the wiring plate with a screw when the substrate is mounted on the wiring plate.

The seventh aspect of the present invention provides a junction box according to the third aspect of this invention, wherein the substrate is disposed on the wiring plate in an erected state, and the terminal block is provided in substantially orthogonal to a plane direction of the substrate.

The eighth aspect of the present invention provides a junction box according to the first aspect of this invention, wherein the wiring plate has a rectangular shape and is formed of a hard resin, and a plurality of cabling paths having electric wires cabled thereon are formed on a back surface of the wiring plate.

The ninth aspect of the present invention provides a junction box according to the first aspect of this invention, wherein the upper cover comprises an expanded portion, and wherein a heat-shielding partition wall for shielding between a power unit and a control unit is provided in the expanded portion.

DETAILED DESCRIPTION OF THE PREFERRED EMBODIMENTS

Hereafter, in order to describe the present invention more in detail, preferred embodiments of this invention will be explained with reference to the accompanied drawings below.

First Embodiment (a) Junction Box

Figure 1:
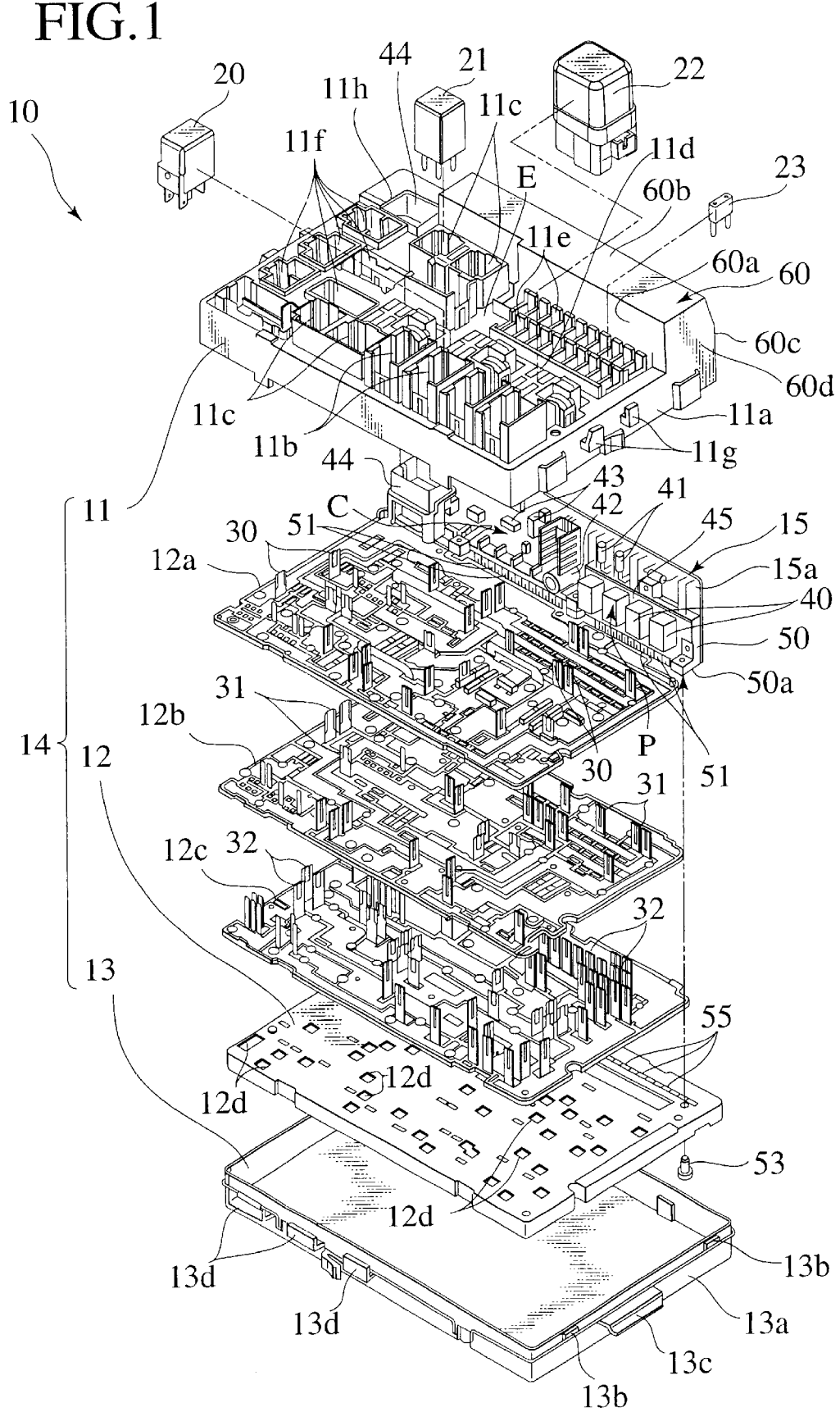
FIG. 1 shows an exploded perspective view illustrating a junction box body of a junction box according to a first embodiment of the present invention.
Figure 2:
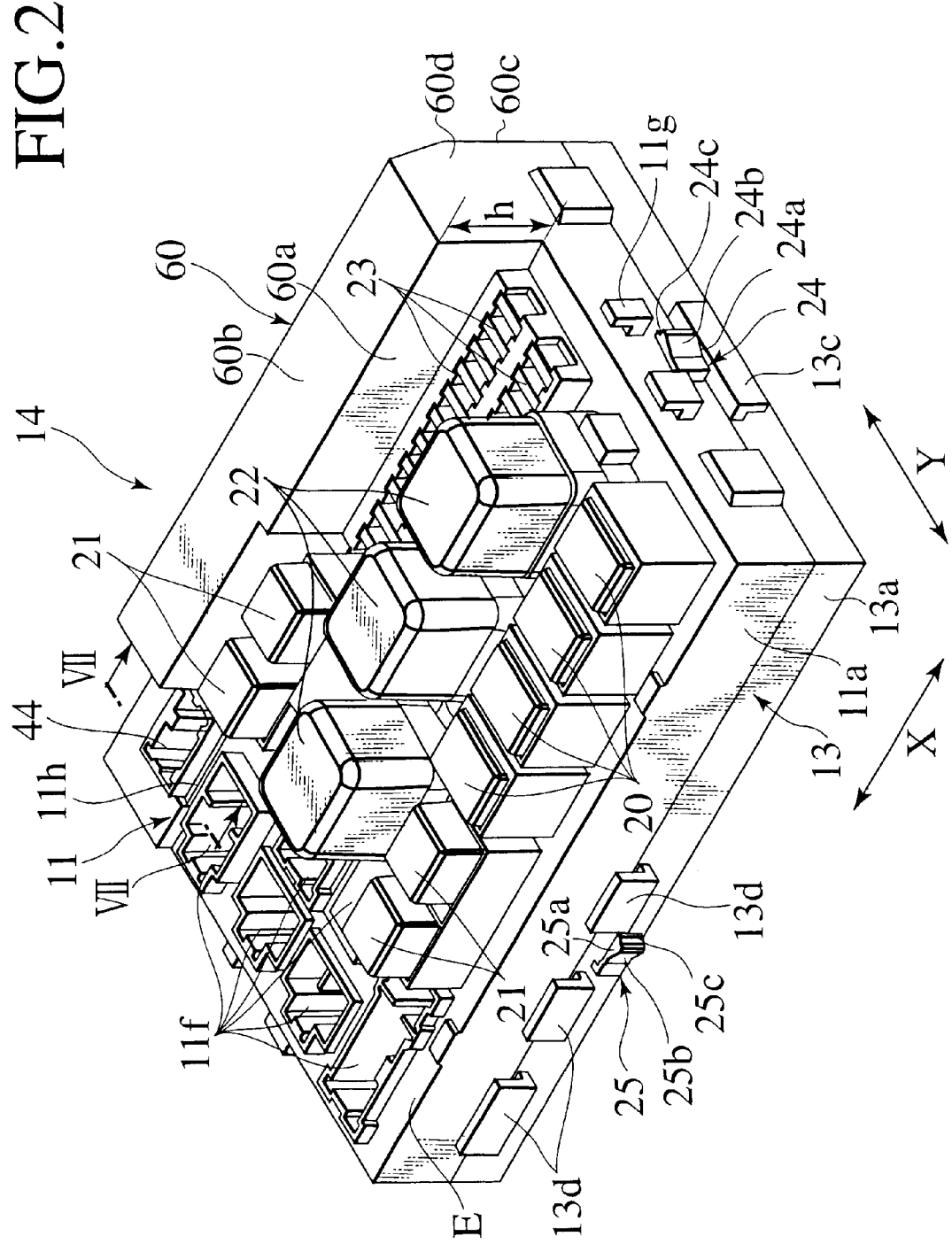
FIG. 2 shows a perspective view illustrating the junction box body of the junction box according to the first embodiment.
Figure 12:
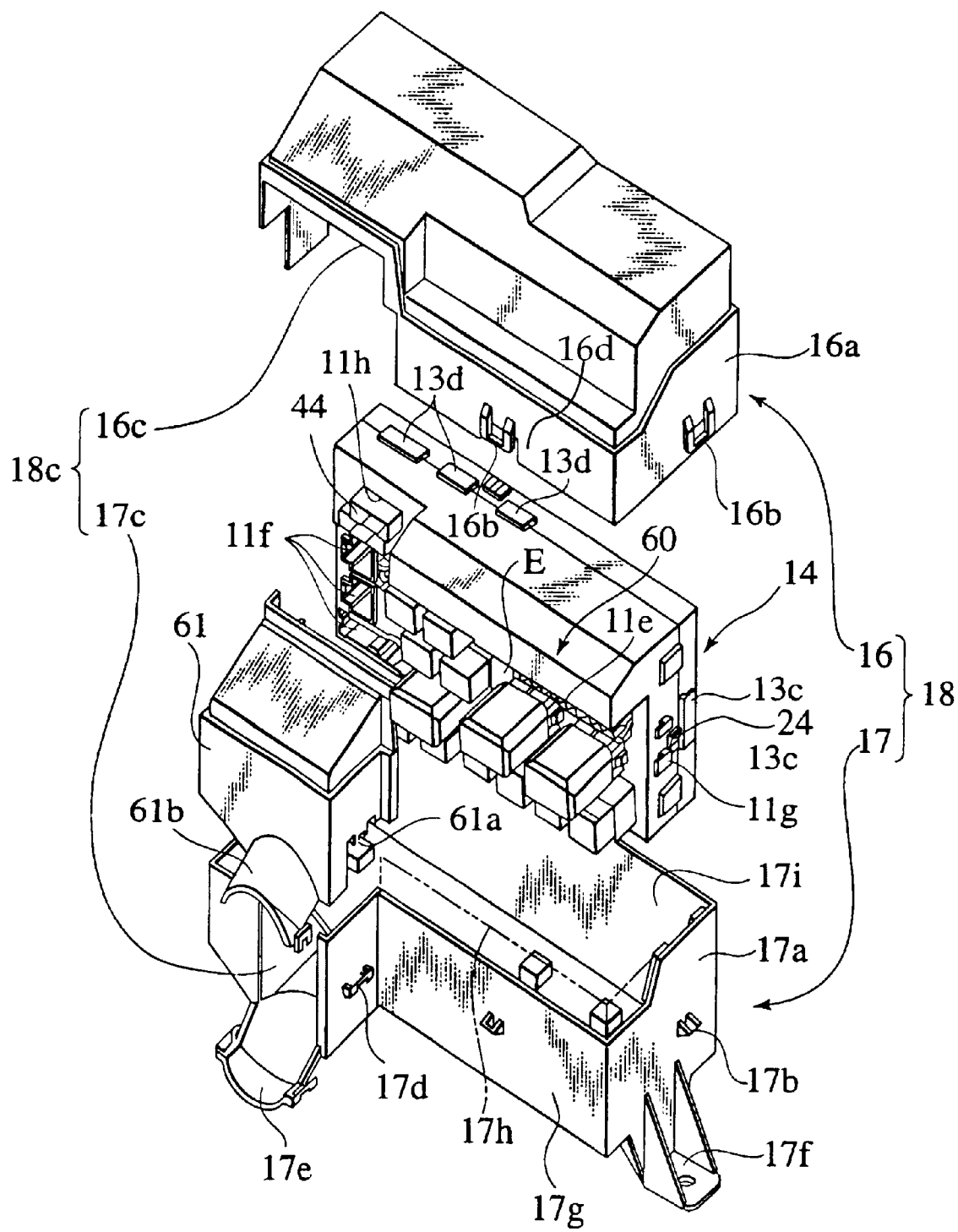
FIG. 12 shows a perspective view of the junction box according to the first embodiment, in which the junction box body, an upper case and a lower case are exploded.

As shown in FIG. 1, multilayer wiring boards 12a, 12b and 12c are stacked together. The stacked wiring boards 12a, 12b and 12c, and a control substrate 15 are mounted on a wiring plate 12. The wiring boards 12a, 12b and 12c, the control substrate 15 and the wiring plate 12 are housed between an upper cover 11 and an under cover 13, so that a junction box body 14 is formed as shown in FIG. 2. As shown in FIG. 12, the junction box body 14 is housed between a lower case 17 and an upper case 16 collectively constituting a casing 18, and thus a junction box 10 of the embodiment is constituted.

(b) Casing 18

The casing 18 is composed of the upper case 16 and the lower case 17. A sidewall 16a of the upper case 16 is fitted into an outer periphery of a sidewall 17a of the lower case 17, and a lock claw 16b on the upper case 16 is engaged or detachably engaged with an engaging protrusion 17b on the lower case 17. The upper case 16 detachably covers a housing hole 17i of the lower case 17. Then, the junction box body 14 is housed from the housing hole 17i of the lower case 17 in a manner that the Y direction (refer to FIG. 2) of the junction box body 14 is configured upright (such a state will be referred to as upright disposition). The upper case 16 is put on the lower case 17 from above, and then the upper case 16 is fitted into the lower case 17.

The upper case 16 and the lower case 17 are partially cut away and opened in positions corresponding to connectors 11f and a substrate connector 44, which are formed on the upper cover 11 in a concentrated manner, thereby forming openings 16c and 17c. When the upper case 16 and the lower case 17 are fitted together, the opening 16c and 17c collectively constitute one opening 18c.

A closing member 61 is provided between the openings 16c and 17c, and independent of both the upper case 16 and the lower case 17. The closing member 61 closes a space between the opening 16c and the opening 17c when the upper case 16 and the lower case 17 are fitted together. A lock claw 61a of the closing member 61 is engaged with and detachably fixed to an engaging protrusion 17d of the lower case 17. At this time, a bottom-half semicylindrical portion 17e formed at a lower portion of the opening 17c and a top-half semicylindrical portion 61b formed at a lower portion of the closing member 61 are joined together into a tube. A bundle of wire harnesses (not shown) for opponent connectors (not shown) to be connected to the connectors 11f and the substrate connector 44 are passed through a tubular portion thus formed. Further, a fitting leg 17f is provided perpendicularly on the lower case 17.

As shown in FIG. 12, upon housing the junction box body 14 in the casing 18, the junction box body 14 is housed into the lower case 17 in a manner that an expanded portion 60 is disposed upward. Then, the upper case 16 is fitted into the outer periphery of the lower case 17 from above, and then lock claw 16b and the engaging protrusion 17b are engaged together. The opponent connector is combined with both the connectors 1 if and the substrate connector 44 of the junction box body 14 through the opening 18c. Then, the wire harnesses are cabled between the top-half and bottom-half semicylindrical portions 61b and 17e. The closing member 61 is disposed inside the opening 18c, and the lock claw 61a is engaged with the engaging protrusion 17d.

When the junction box body 14 is inserted and housed into the lower case 17 from above and closed with the upper case 16, first locking pieces 24 on both sidewalls 11a and 13a of the junction box body 14 in the Y direction (refer to FIG. 2) are engaged with engaging projections (not shown) provided inside the lower case 17. Further, regarding second locking pieces 25 on the both sidewalls 11a and 13a of the junction box body 14 in the X direction (refer to FIG. 2), outer side faces of parallel protruding portions 25a (the thickest parts of inclined planes 25b) abut on an inner face of a ceiling of the upper case 16 elastically, thereby preventing the junction box body 14 from jolting up-and-down in the casing 18.

When the junction box body 14 is housed into the casing 18, an embedding stage E on the upper cover 11 is disposed on a front face 17g of the lower case 17. At this time, a fuse outlet 11e in the embedding stage E is located on an upper right portion of the front face 17g (as illustrated with a chain double-dashed line in the drawing).

In the embodiment, the upper right portion of the lower case 17 is cut away in advance, thereby forming a cutaway portion 17h where the fuse outlet 11e is exposed. A closing portion 16d is provided on a lower end of a front face of the upper case 16 for covering the cutaway portion 17h. When the upper case 16 is fitted into the lower case 17, the cutaway portion 17h is covered with the closing portion 16d.

(c) Covers

The sidewall 11a surrounding the upper cover 11 is engaged with and detachably fitted into the upper-end peripheral face of the sidewall 13a surrounding the under cover 13 via the lock claw 13b. The wiring plate 12 and the control substrate 15 are housed between the upper cover 11 and the under cover 13.

Figure 3:
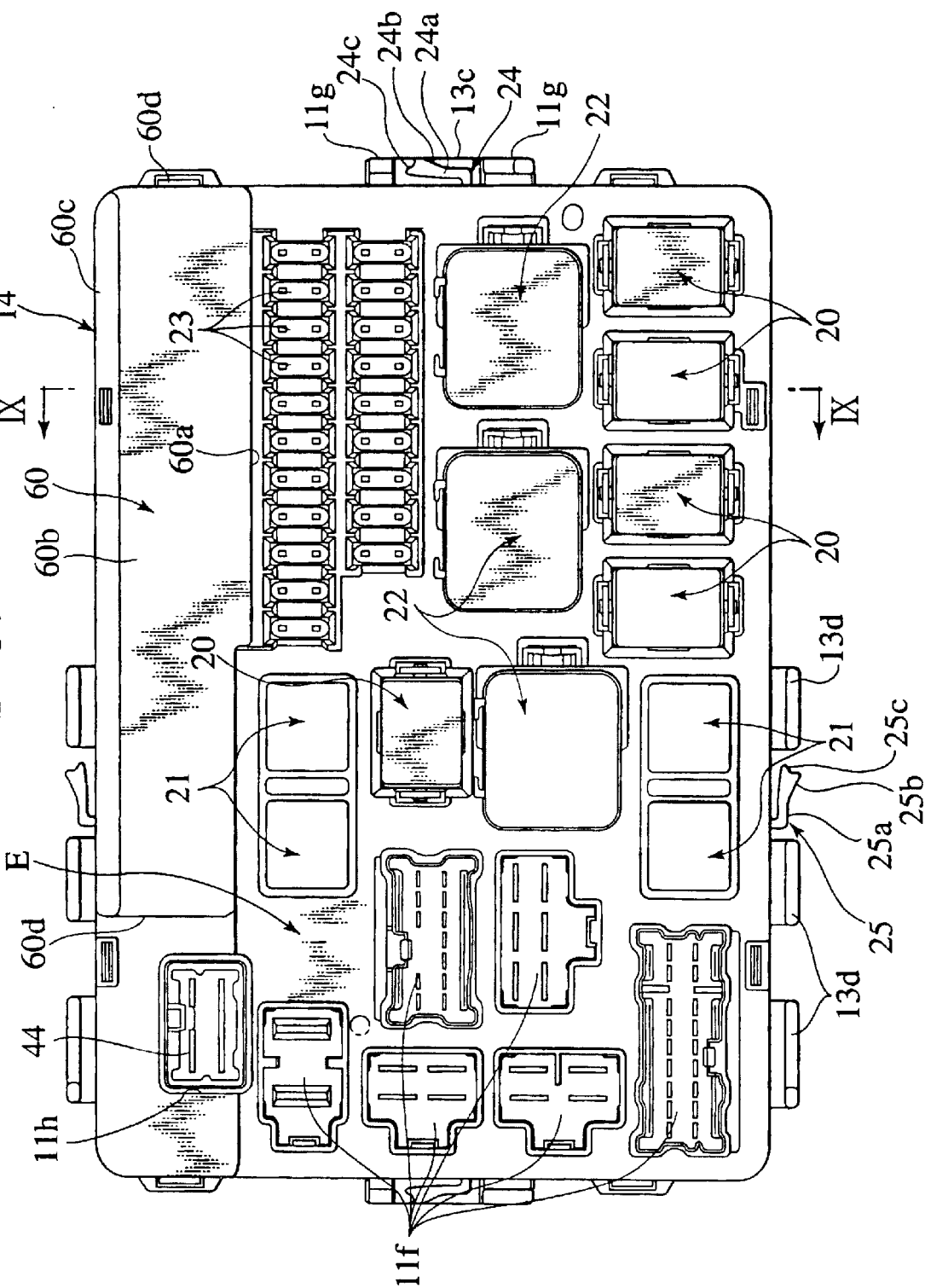
FIG. 3 shows a plan view illustrating the junction box body of the junction box according to the first embodiment.

As shown in FIGS. 1, 2 and 3, an upper face of the upper cover 11 constitutes the embedding stage E for embedding various relays such as micro relays 20, half-micro relays 21 and 2M relays 22 and electronic components such as fuses 23 (the electronic components are fitted externally). On the embedding stage E, provided are outlets 11b, 11c and 11d for inserting the various relays such as the micro relays 20, the half-micro relays 21 and the 2M relays 22. Further, on the embedding stage E, provided is the fuse outlet 11e as fuse fitting portions where the fuses 23 are fitted.

The plurality of connectors 11f, which are constituted as connector fitting portions for detachably fitting opponent connectors, are locally provided on one side (at a left end in FIG. 3) of the upper cover 11 in a concentrated manner.

As shown in FIG. 2, the first locking pieces 24 as locking means are provided in a protruding manner on the both ends of the sidewall 11a of the upper cover 11 in the Y direction. Further, the second locking pieces 25 as the locking means are provided in a protruding manner on the both ends of the sidewall 13a of the under cover 13 in the X direction. The first locking pieces 24 and the second locking pieces 25 protrude perpendicularly out of the sidewalls 11a and 13a severally, and extend parallel to the sidewalls 11a and 13a, thereby formed into L-shaped cross sections as a whole. On each outer face of a parallel protruding portion 24a or 25a of the first or the second locking piece 24 or 25, formed is an inclined plane 24b or 25b which is gradually thickened toward a tip thereof. On the tip of the inclined plane 24b or 25b, provided is a stepped engaging portion 24c or 25c.

Upon housing the junction box body 14 into the lower case 17 (refer to FIG. 12), any of the first and the second locking pieces 24 and 25 are engaged with engaging projections provided inside the casing 18, depending on a housing direction (either the Y direction or the X direction) of the junction box body 14. Upon such engagement of the first or the second locking pieces 24 or 25, when the inclined plane 24b or 25b is pressed onto the engaging projection in accordance with dropping the junction box body 14 into the lower case 17 for housing, the parallel protruding portion 24a or 25a flexure deformed inward. Then, the junction box body 14 is further dropped into the lower case 17, thereby releasing the inclined plane 24b or 25b from the engaging projection, and the parallel protruding portion 24a or 25a recovers out with elastic force, whereby the engaging portion 24c or 25c is engaged with the engaging projection.

In a state of engagement as described above, the parallel protruding portion 24a or 25a protrudes toward a direction reverse to the housing direction of the junction box body 14 (i.e., upward). Upon unlocking, a jig with a slender tip such as a screw driver is inserted from above into a space between the junction box body 14 and the casing 18 in order to catch the tip of the engaging portion 24c or 25c with the tip of the jig. The parallel protruding portions 24a or 25a are flexed inward, so that engagement of the engaging portion 24c or 25c with the engaging projection can be released easily.

In the vicinity of the portions where the first and the second locking pieces 24 and 25 are formed, first guide hooks 11g and 13c, and second guide hooks 13d all having L-shaped cross sections are formed in a protruding manner. The first and the second guide hooks 11g, 13c and 13d serve as guides upon housing the junction box body 14 into the lower case 17. Therefore, the connection box body 14 can be set to a specified position in the casing 18.

(d) Wiring Plate

As shown in FIG. 1, the wiring plate 12 is a rectangular hard-resin plate similar to an inverted dish. Numerous wiring holes 12d are formed on the wiring plate 12. Three layers of wiring boards 12a, 12b and 12c are stacked on the wiring plate 12. On a rear face of the wiring plate 12, a plurality of electric wires 56 are cabled.

On the respective wiring boards 12a, 12b and 12c, bus bars constituted by erecting respective terminal portions 30, 31 and 32 upward from given positions are disposed, thereby forming a predetermined circuit on each wiring board. Further, each of the wiring boards 12a, 12b and 12c includes a pressure-welding terminal 57. The pressure-welding terminal 57 is integrally formed on the bus bar and erected downward from the given position.

Figure 11:
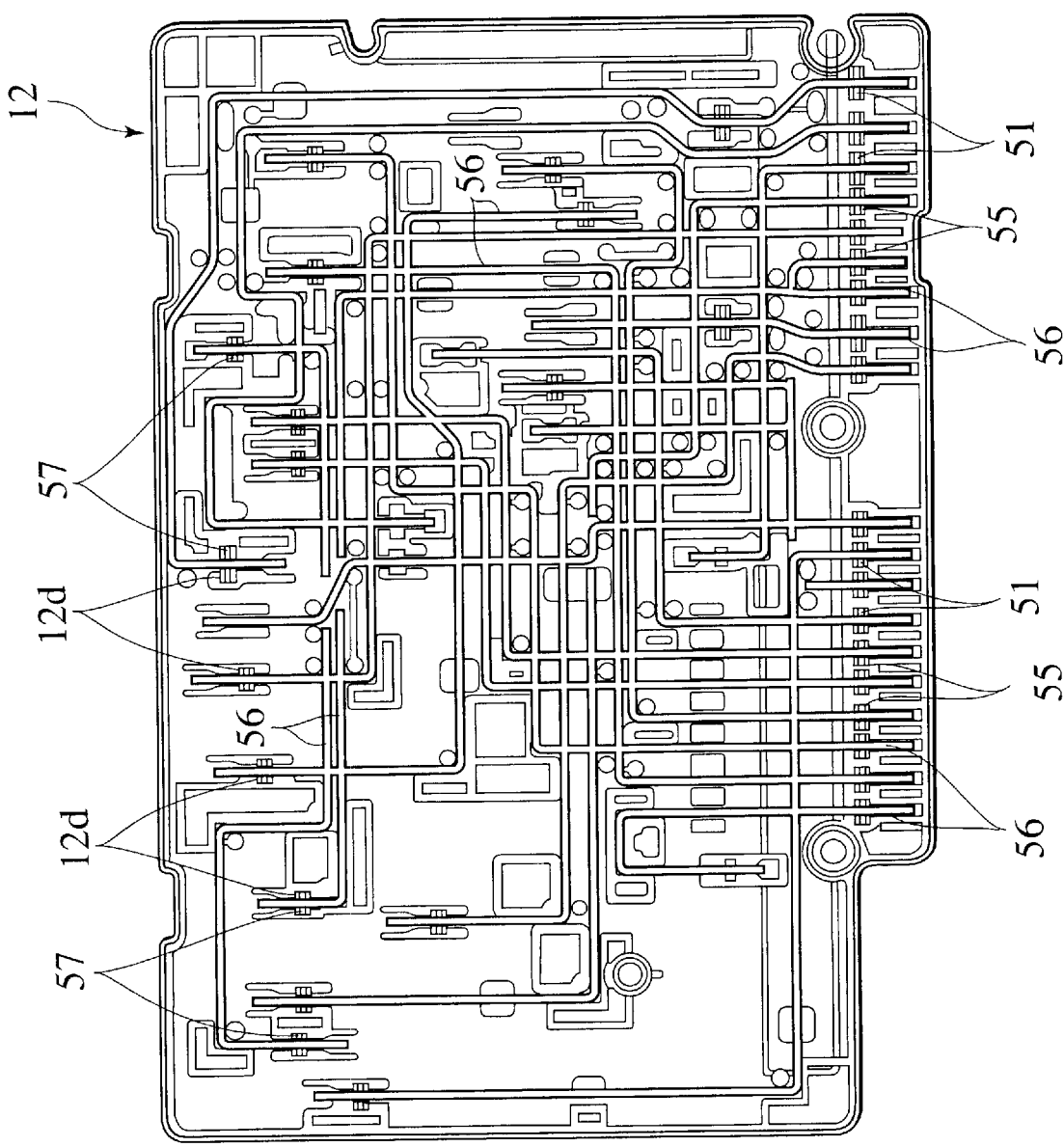
FIG. 11 shows an explanatory view for electric wires to be cabled on the wiring plate of the junction box according to the first embodiment.

The terminals 32 on the low-stage wiring board 12c penetrate the wiring boards 12a and 12b thereabove and protrude out to an upper face of the high-stage wiring board 12a. The terminals 31 of the middle-stage wiring board 12b penetrate and protrude from the high-stage wiring board 12a. The wiring boards 12a, 12b and 12c are superimposed vertically. At this time, the pressure-welding portions 57 of the respective wiring boards 12a, 12b and 12c are drawn from the wiring holes 12d to the rear face of the wiring plate 12. As shown in FIG. 11, the pressure-welding terminals 57 are connected to the electric wires 56 by pressure welding. Therefore, the predetermined circuit including the respective wiring boards 12a, 12b and 12c, and the electric wires 56 is formed on the wiring plate 12.

(e) Control Substrate

Figure 4:
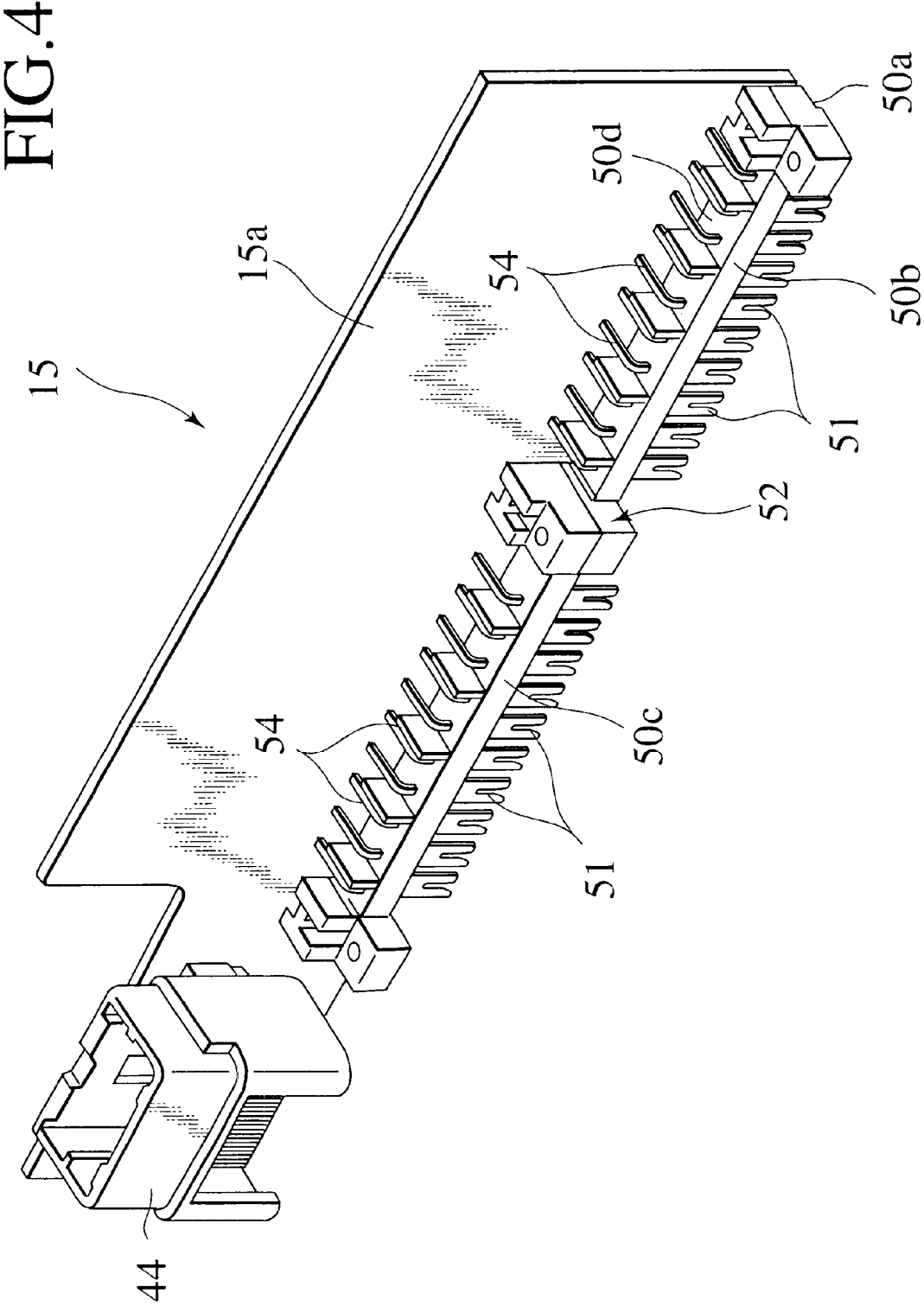
FIG. 4 shows an enlarged perspective view illustrating a basic structure of a control substrate of the junction box according to the first embodiment, in which various electronic components are removed.

In the control substrate 15, various electronic components such as relays 40, resistors 41, a coil 42 and elements 43 constituting a control circuit are fitted on an insulating plate 15a. The substrate connector 44 is provided on an end portion in the longitudinal direction of the control substrate 15. As shown in FIG. 4, the control substrate 15 is disposed in an upright state. A terminal block 50 is fitted on a bottom end of the front side of the control substrate 15 in a direction almost perpendicular to a plane of the control substrate 15. Further, on a perpendicular outer face 50a of the terminal block 50, pressure-welding terminals 51 are provided in a protruding manner. The pressure-welding terminals 51 are connected to the relevant circuits on the respective wiring boards 12a, 12b and 12c via the electric wires 56 cabled on the back of the wiring plate 12.

Figure 5:
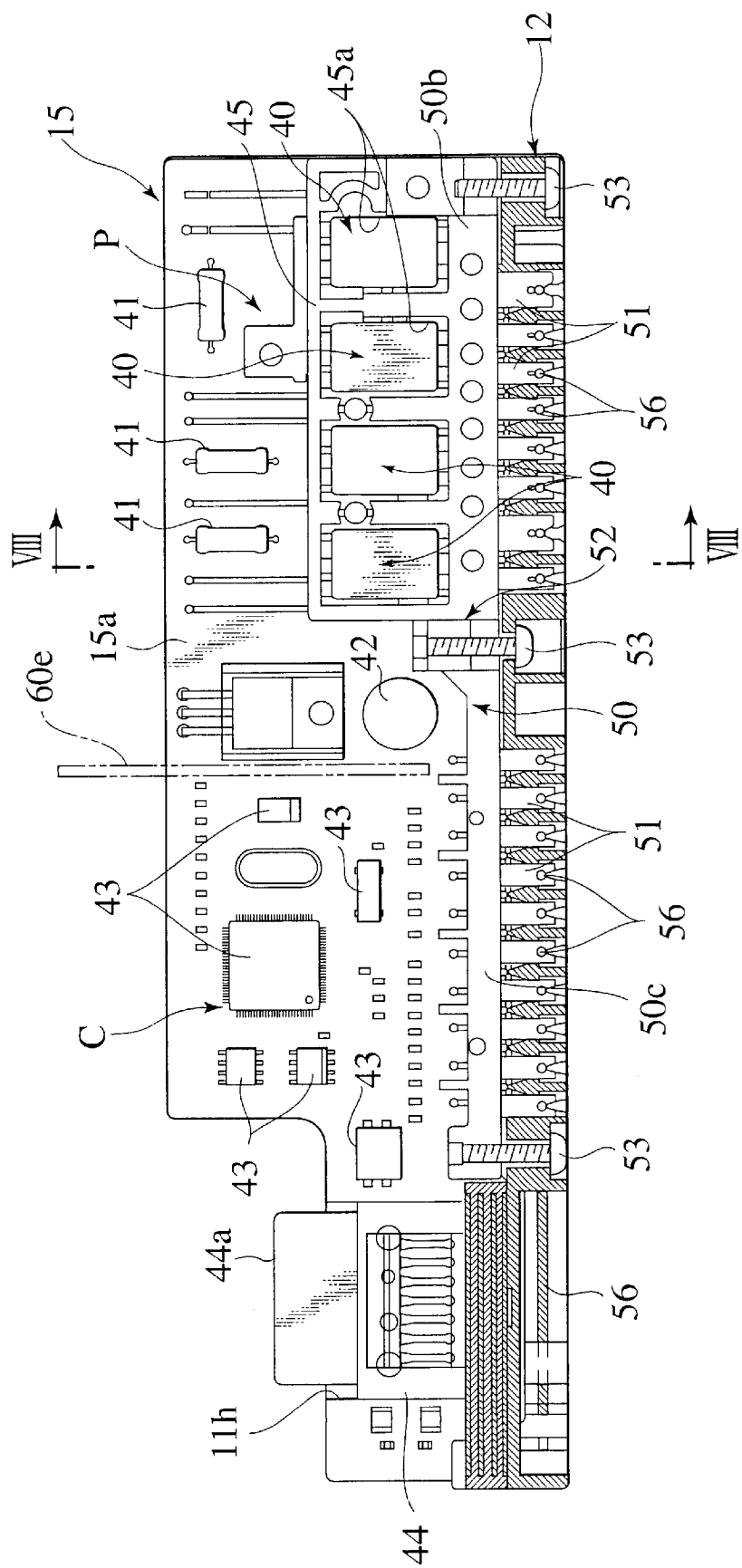
FIG. 5 shows a front view illustrating a state of that the control substrate is mounted on a wiring plate of the junction box according to the first embodiment.

Among the various electric components to be fitted to the control substrate 15, the relays 40, the resistors 41 and the coil 42 collectively constitute a power unit P. Further, the elements 43 constitute a control unit C. As shown in FIG. 5, the power unit P of large heat generation is closely disposed on one side in the longitudinal direction (the near side in FIG. 1) of the insulating plate 15a. Meanwhile, the control unit C of small heat generation is closely disposed on the other side in the longitudinal direction (the far side in FIG. 1) of the insulating plate 15a.

Figure 10:
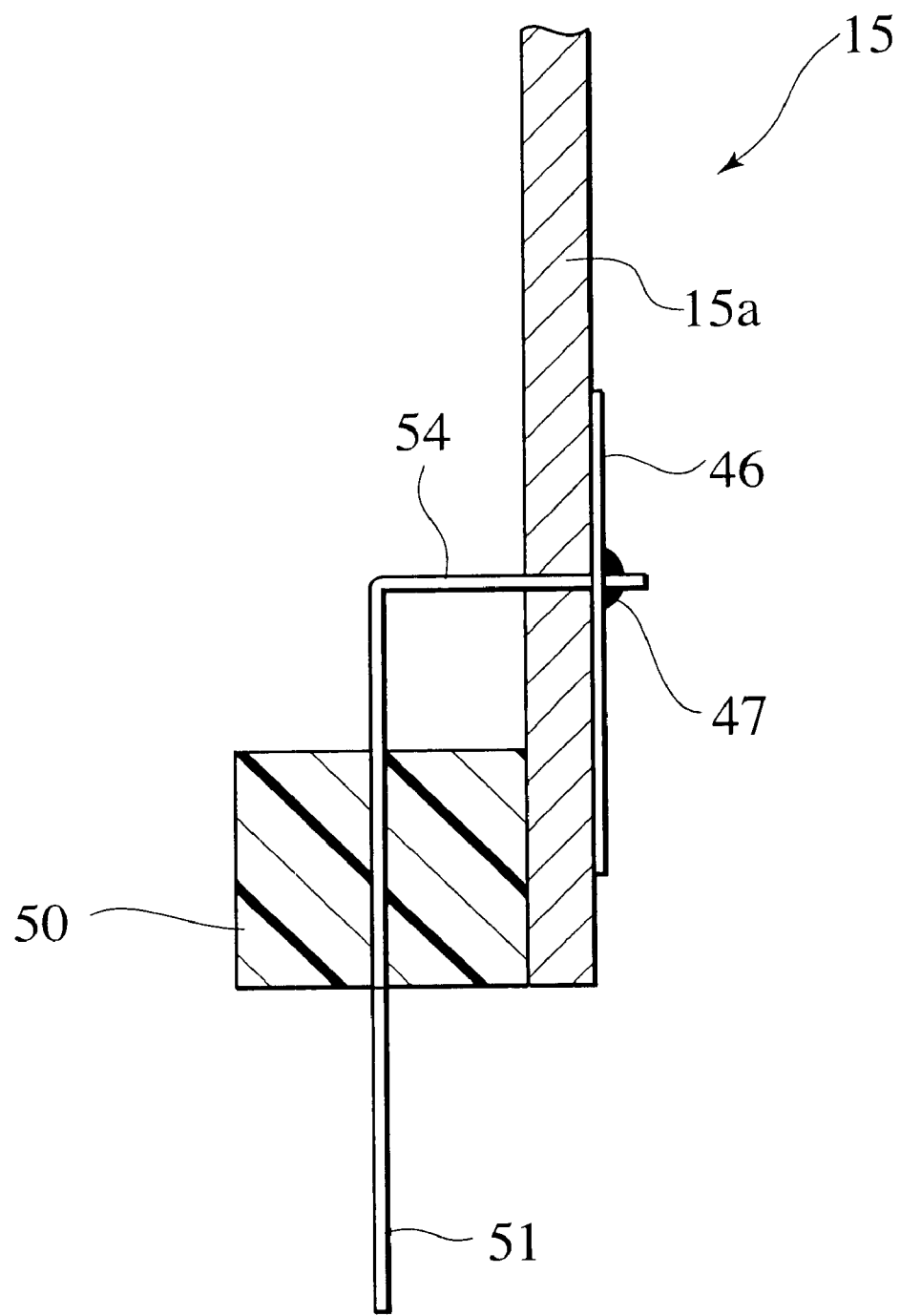
FIG. 10 shows a cross-sectional view of principal parts of the junction box according to the first embodiment, which illustrates a structure of connection between a pressure-welding terminal and a circuit pattern on the control substrate.

The relays 40, the resistors 41 and the coil 42 constituting the power unit P of large heat generation and the elements 43 constituting the control unit C of small heat generation are connected by a thin circuit pattern 46 (refer to FIG. 10).

The circuit pattern 46 is formed by printing a conductive material on the insulating plate 15a. The thickness of the circuit pattern 46 is decided in accordance with the width of printing.

(f) Substrate Connector

Figure 6:
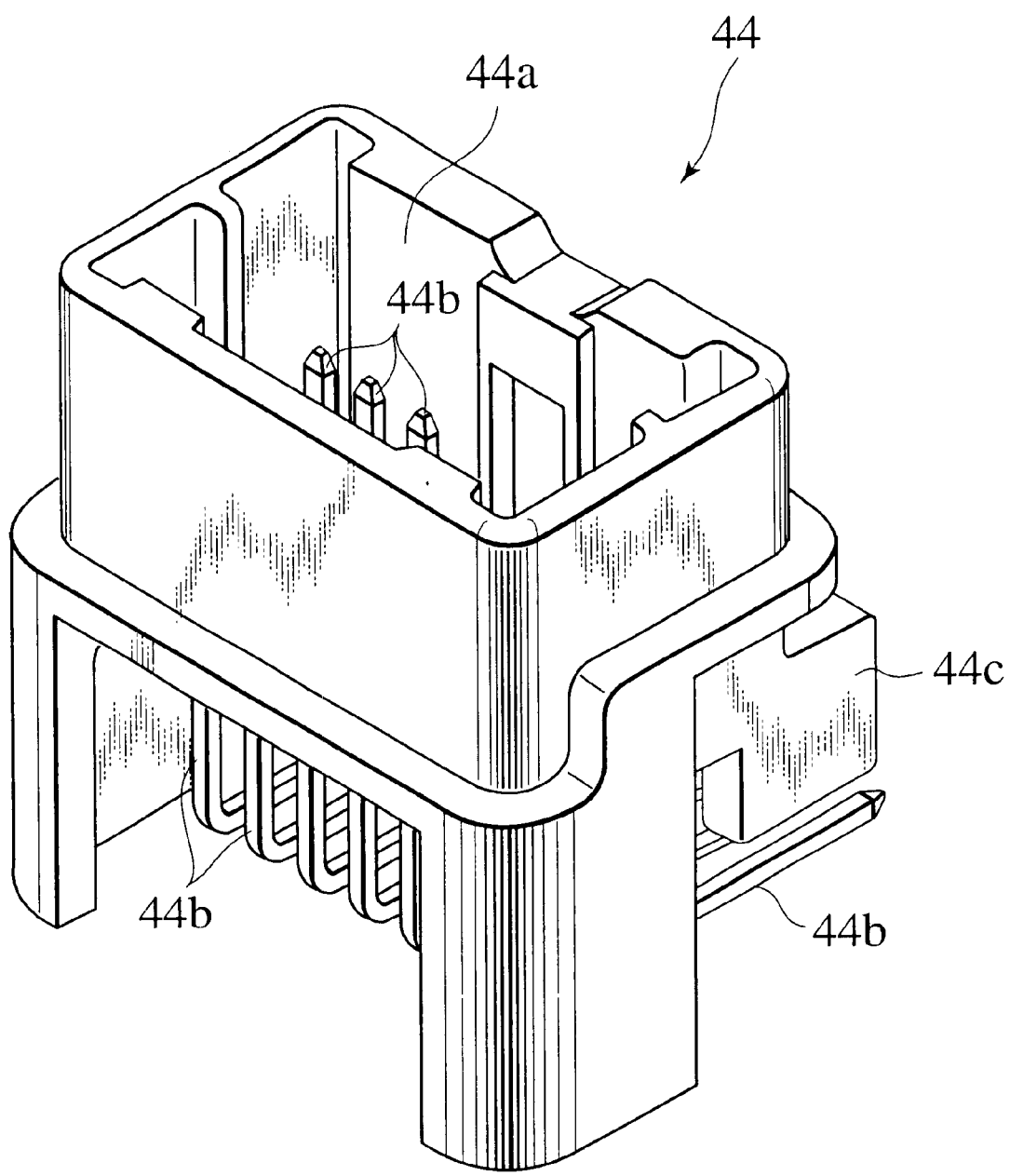
FIG. 6 shows a perspective view illustrating a substrate connector of the junction box according to the first embodiment.

As shown in FIG. 6, the substrate connector 44 is provided independently of the control substrate 15. An opponent connector is inserted into a slot 44a formed on the substrate connector 44. Inside the slot 44a, end portions of a plurality of terminals 44b to be connected to the opponent connector protrude out. The other ends of the terminals 44b protrude outward from the slot 44a, and tips thereof are orderly bent perpendicularly to the control substrate 15.

Figure 7:
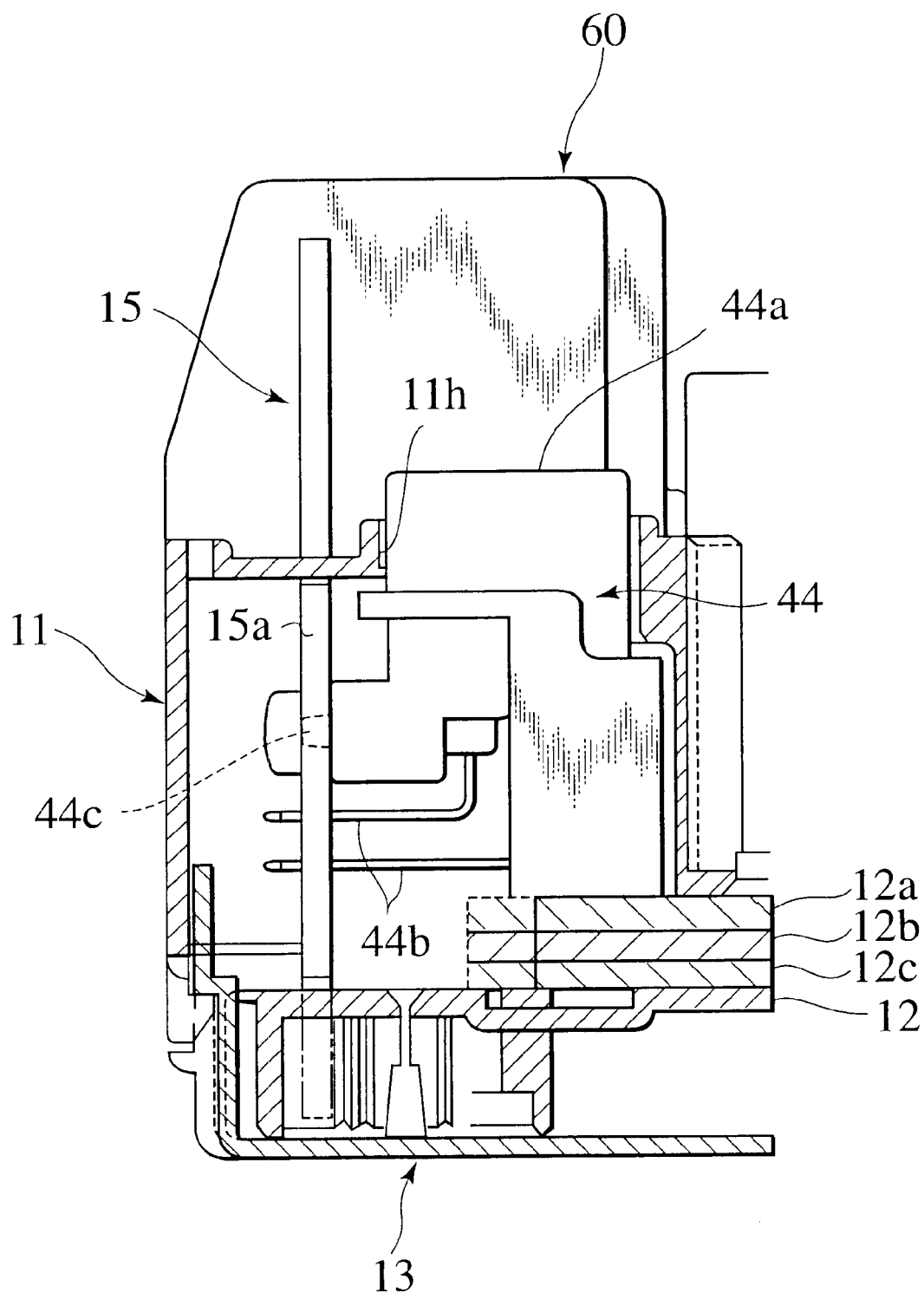
FIG. 7 shows an enlarged cross-sectional view of principal parts of the junction box according to the first embodiment, which is taken along the VII—VII line in FIG. 2.

As shown in FIG. 7, in the substrate connector 44, a protrusion 44c provided on a back side thereof is fitted by pressure into a fitting hole (not shown) formed on the insulating plate 15a of the control substrate 15. The tips of the terminals 44b are inserted into the control substrate 15 and connected to the given circuit pattern 46. At this time, an open portion of the slot 44a of the substrate connector 44 faces outward from an aperture 11h formed on the upper cover 11.

(g) Relay

Figure 8:
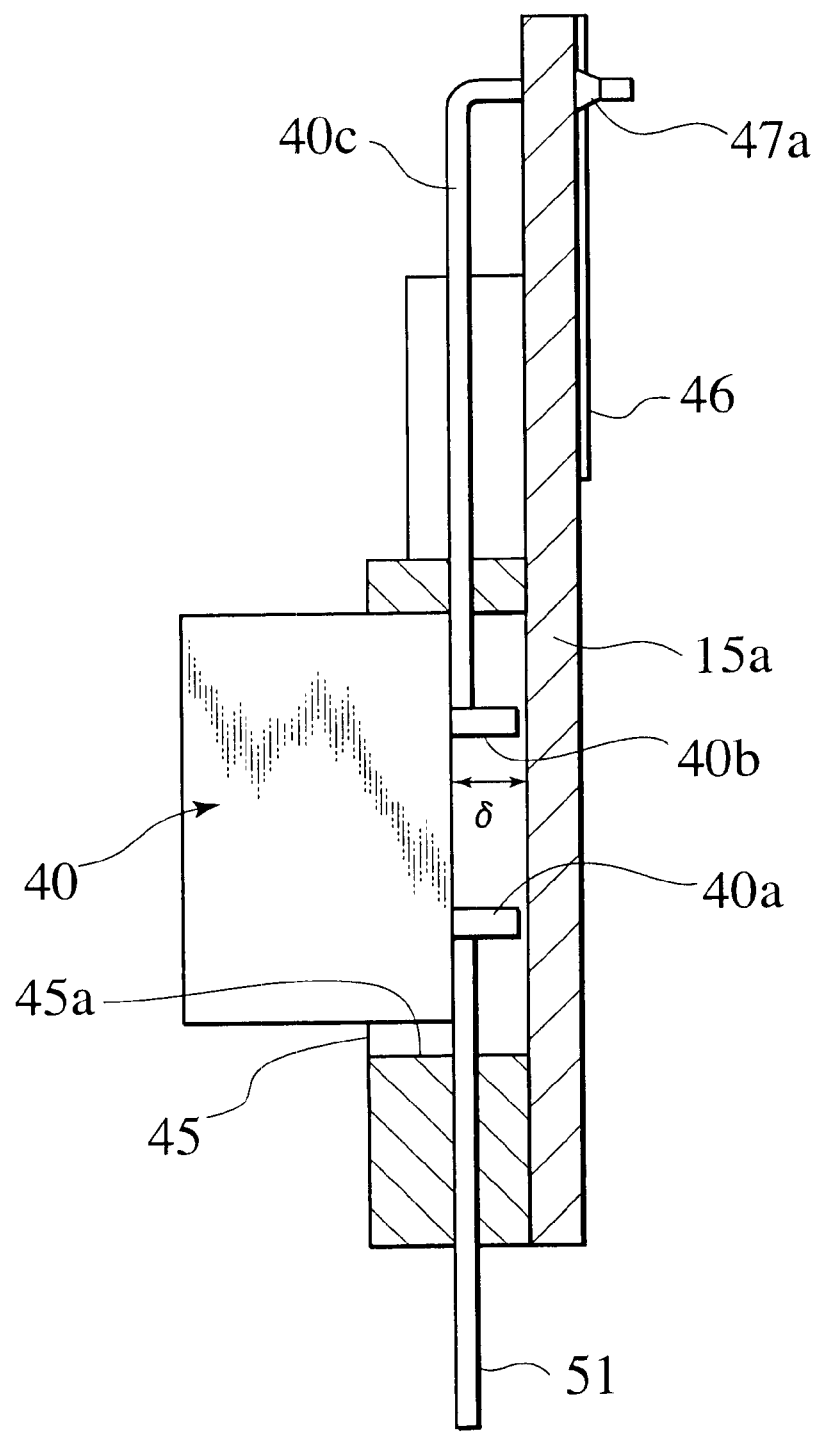
FIG. 8 shows an enlarged cross-sectional view of principal parts of the junction box according to the first embodiment, which is taken along the VIII—VIII line in FIG. 5.

The relay 40 adopts a mechanism using electromagnetic solenoid. The relay 40 has a structure for on-and-off switching with the electromagnetic solenoid. Since heat generation by the electromagnetic solenoid is significant, as shown in FIG. 8, the relay 40 is supported by a relay holder plate 45 to be described later, whereby the relay 40 is fitted to the insulating plate 15a of the control substrate 15 with provision of a given space δ.

In the relay 40 thus fitted with the space, a lead line 40c and a given pressure-welding terminal 51 to be described later are connected to power terminals 40a and 40b, respectively. In a space from the relay 40 until reaching the insulating plate 15a, the lead line 40c extends long as parallel to the insulating plate 15a and protrudes out, then a tip of the portion thus exposed by protrusion is bent toward the insulating plate 15a and soldered to the circuit pattern 46 with solder 47a. In this case, the exposed lead line 40c can include a heat releasing function.

(h) Terminal Block

Figure 9:
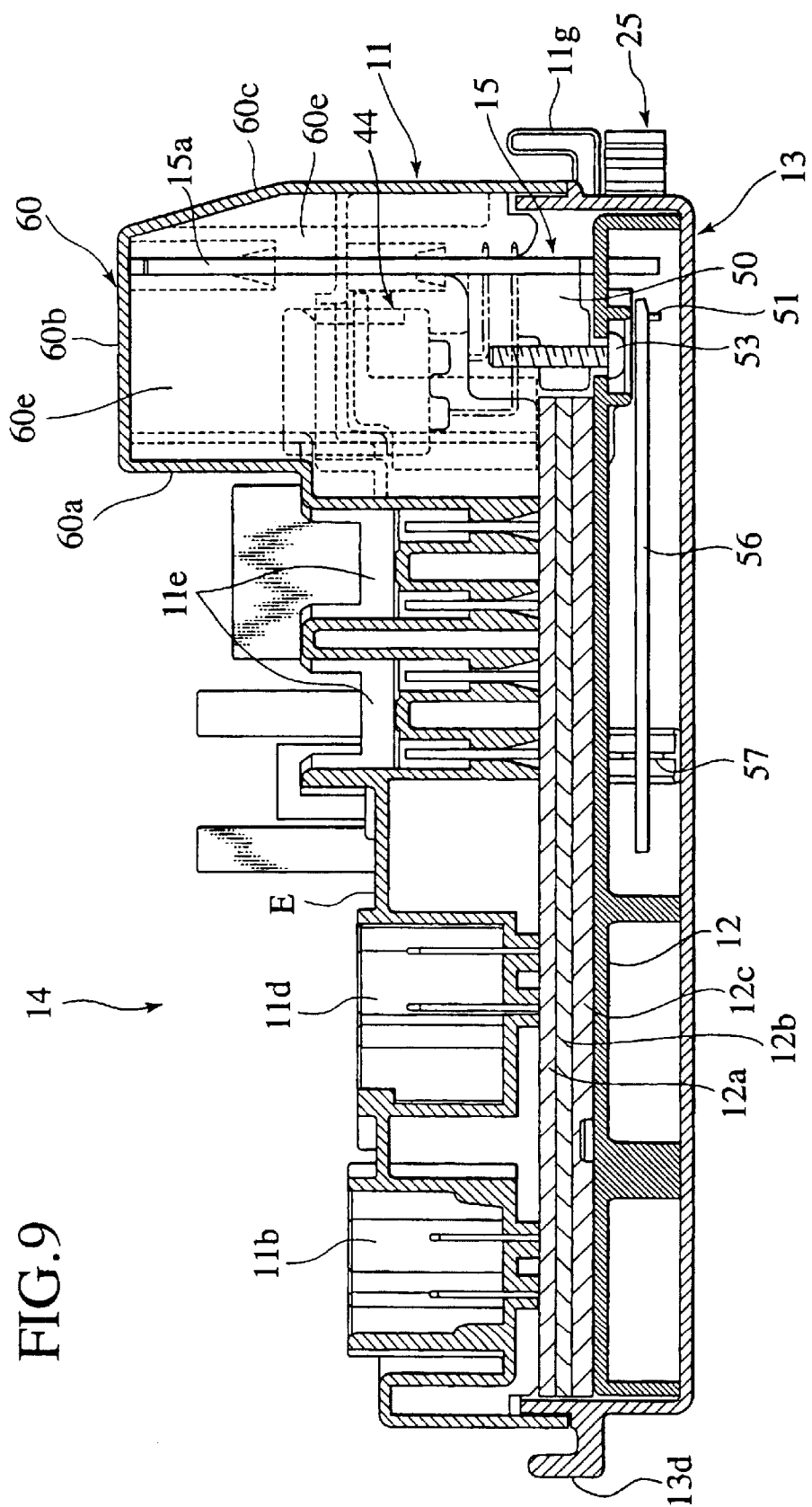
FIG. 9 shows a cross-sectional view of the junction box according to the first embodiment, which is taken along the IX—IX line in FIG. 3.

The terminal block 50 is composed of a first divided block 50b and a second divided block 50c which are bisected approximately in the center portion in the longitudinal direction thereof. As shown in FIG. 4, mutually abutting end portions of the first and the second divided blocks 50b and 50c are superimposed on each other (a superimposed portion 52). As shown in FIG. 9, both end portions of the terminal block 50 and the superimposed portion 52 are fixed by fastening onto the wiring plate 12 with screws 53 as fasteners to be inserted from the rear face of the wiring plate 12. At this time, as shown in FIG. 5, the superimposed portion 52 is fastened integrally with one screw 53.

The relay holder plate 45 is provided on a perpendicular inner face 50d of the first divided block 50b as parallel to the insulating plate 15a. Windows 45a are formed on the relay holder plate 45 in accordance with disposing portions of the relays 40. The relays 40 are fitted and held into the windows 45a, whereby the relays 40 being fitted to the insulating plate 15a with provision of spaces are stably held therein.

(i) Pressure-Welding Terminal

As shown in FIG. 4, one end of the pressure-welding terminal 51 is provided in a manner protruding from the perpendicular outer face 50a of the terminal block 50. The pressure-welding terminal 51 includes a conduction wire portion 54 on the other end thereof which protrudes from an upper part of the terminal block 50. The conduction wire portion 54 is bent perpendicularly toward the insulating plate 15a, and then penetrates the insulating plate 15a. As shown in FIG. 10, such a penetrating portion is soldered to the circuit pattern 46 of the control substrate 15 with solder 47.

As shown in FIG. 8, in the given pressure-welding terminal 51 to be connected to the relay 40, the other end of the pressure-welding terminal 51 penetrates the relay holder portion 45 and protrudes into the window 45a.

As shown in FIG. 1, the pressure-welding terminals 51 are inserted from outlets 55. As shown in FIG. 5, the inserted pressure-welding terminals 51 are connected to terminals of the electric cables 56 by pressure welding. At this time, the perpendicular outer face 50a abuts on an upper face of the wiring plate 12. In this state, the perpendicular outer face 50a is fixed by fastening with the screws 53. As described above, in the state that the terminal block 50 is fixed to the wiring plate 12, the terminal block 50 is almost perpendicular with respect to the insulating plate 15a. Therefore, the control substrate 15 is mounted perpendicularly with respect to the wiring plate 12.

(j) Expanded Portion of Upper Cover

As shown in FIGS. 1 and 2, in the upper cover 11, an expanded portion 60 is formed on one side edge (far sides in FIG. 12) on the side where the control substrate 15 is fitted on the embedding stage E. The expanded portion 60 has a protruding amount h greater than the various external relays 20, 21 and 22, and the fuses 23, which are fitted on the relay outlets 11b, 11c and 11d, and the fuse outlet 11e. As shown in FIG. 9, the control substrate 15 is housed inside the expanded portion 60.

As shown in FIG. 9, the expanded portion 60 includes a heat shield wall 60a for shielding the control substrate 15 from the various relay outlets 11b, 11c and 11d of the upper cover 11, a ceiling wall 60b continuing from the heat shield wall 60a and a back face wall 60c covering the rear side of the control substrate 15, and is thereby formed into a U-shaped cross section. As shown in FIG. 2, both sides thereof are closed by sidewalls 60d.

As shown in FIG. 9, inside the expanded portion 60, provided is a heat-shielding partition wall 60e to be inserted between the power unit P and the control unit C for shielding the power unit P and the control unit C. Note that the heat-shielding partition wall 60e is illustrated with a chain double-dashed line in FIG. 5.

In the state that the control substrate 15 is housed between the upper cover 11 and the under cover 13, the expanded portion 60 covers the outside of the control substrate 15. Moreover, the heat-shielding partition wall 60e is inserted into an interface portion between the power unit P of large heat generation and the control unit C of small heat generation.

According to the junction box 10 of the first embodiment, the control substrate 15 as a controller is mounted on the wiring plate 12. Then, the control substrate 15 thus mounted is housed between the upper cover 11 and the under cover 13, thereby constituting the connection box body 14. The connection box body 14 is housed into the casing 18 composed of the upper case 16 and the lower case 17, thus constituting the junction box 10. In the junction box 10, the lower case 17 is fitted inside an engine room of a vehicle (not shown) via the fitting leg 17f. Thus, wire harnesses for various electrical components to be installed on the vehicle are connected closely in a small area.

The cutaway portion 17h is formed on the lower case 17 in order to expose the fuse outlet 11e of the junction box body 14. Hence, in the event of changing the fuses 23, the upper case 16 is detached from the lower case 17, whereby the fuse outlet 11e of the junction box body 14 is exposed out of the cutaway portion 17h. Therefore, it is possible to change the fuses 23 easily through the exposed cutaway portion 17h. Accordingly, upon changing the fuses 23 which occurs rather frequently, an onerous operation of extracting the junction box body 14 out of the lower case 17 is curtailed, so that an operation of changing the fuses 23 is substantially simplified.

Moreover, the closing portion 16d for covering the cutaway portion 17h is provided on the upper case 16. Therefore, the closing portion 16d prevents entrance of dust from the cutaway portion 17h into the casing 18, such that the inside of the casing 18 is maintained clean.

Second Embodiment

In the following, description will be made regarding a second embodiment of the junction box according to the present invention with reference to FIGS. 13 and 14. Note that identical constituents to those in the foregoing embodiment are designated with identical reference characters and repetitive description thereto will be omitted herein.

Figure 13:
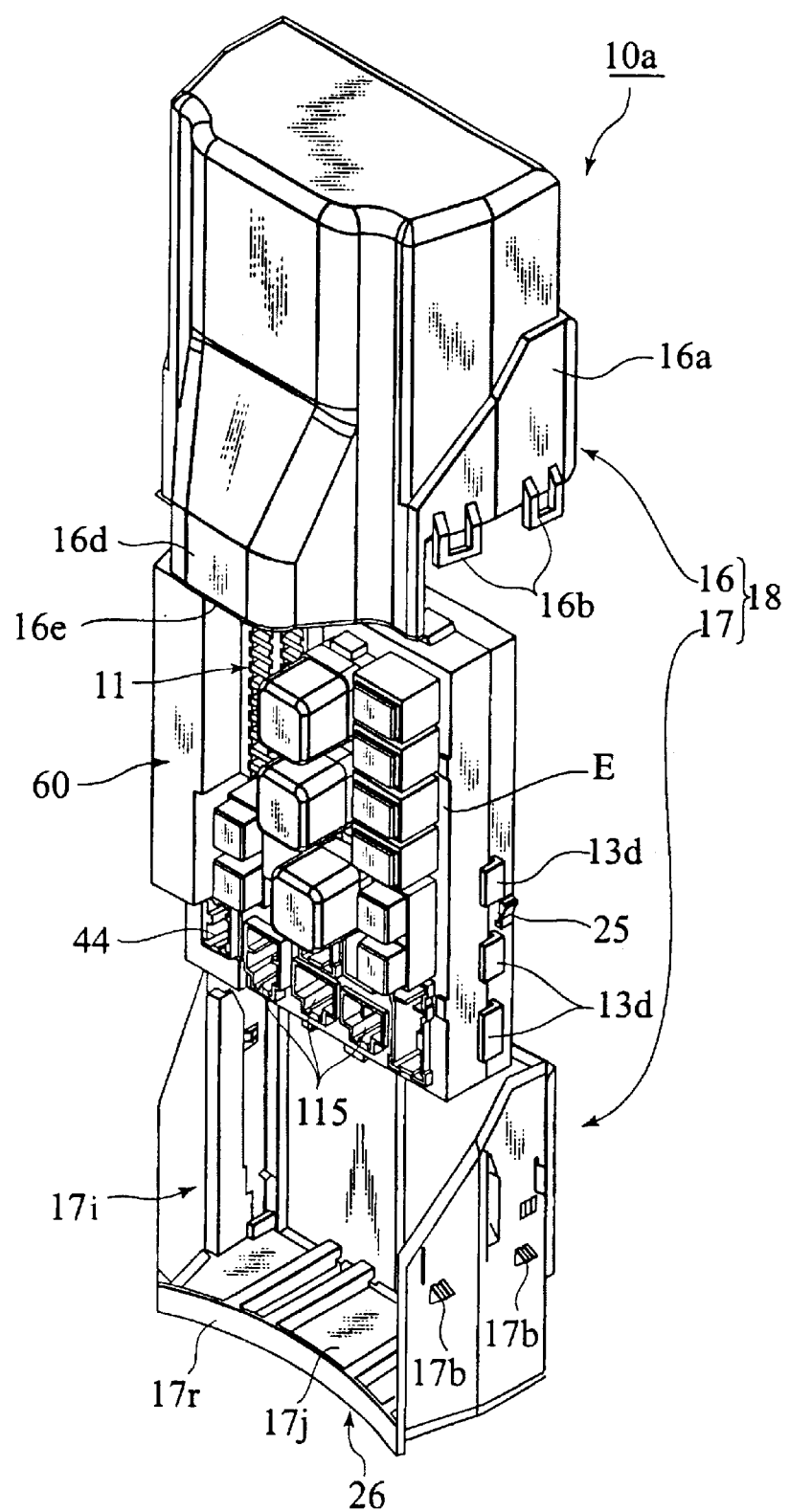
FIG. 13 shows a perspective view of a junction box according to a second embodiment, in which a junction box body, an upper case and a lower case are exploded.
Figure 14:
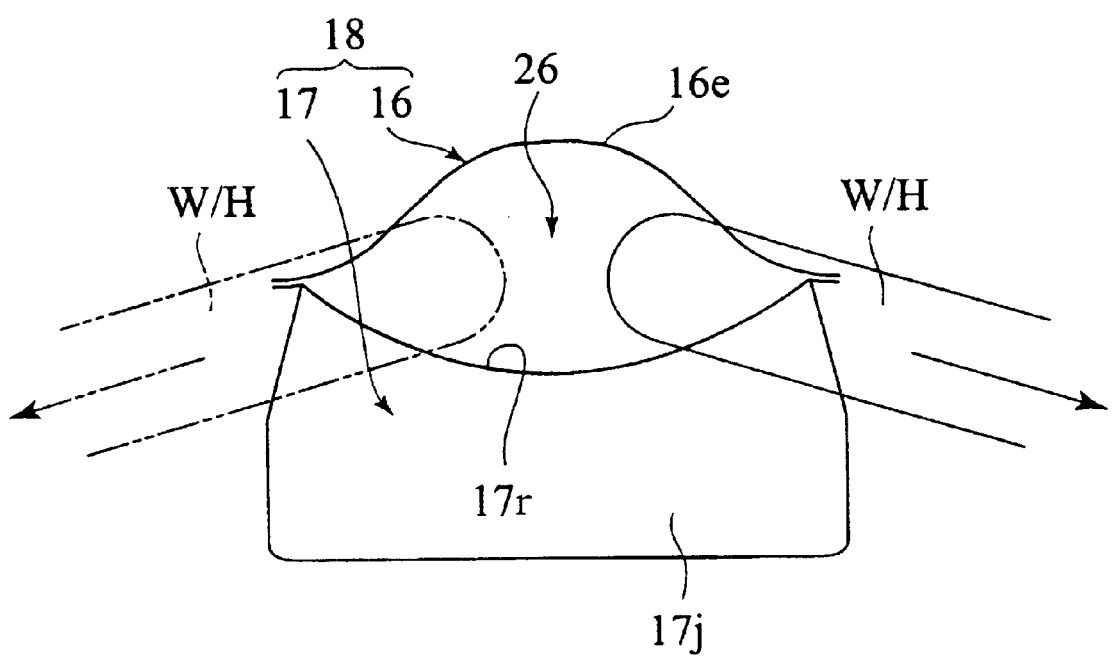
FIG. 14 shows an explanatory view for a state of cabling a wire harness in the junction box according to the second embodiment.

As shown in FIG. 13, in a junction box 10a of the second embodiment, a junction box body 14 is housed from a housing hole 17i of a lower case 17 in a manner that the X direction (refer to FIG. 2) of the junction box body 14 is disposed upright (such a state is referred to as horizontal disposition). The junction box 10a is designed in a manner that an upper case 16 is put on and fitted into the lower case 17 from above.

According to the second embodiment, a front face of the lower case 17 facing an embedding fixation stage E of the junction box 10a is removed to constitute a cutaway portion. A fuse outlet 11e of the junction box 10a is substantially exposed inside the cutaway portion when the upper case 16 is detached.

Meanwhile, on the upper case 16, formed is a closing portion 16d of which a front face is entirely stretched downward for covering the cutaway portion.

A bottom face 17j of the lower case 17 constitutes a forming edge of the cutaway portion. Here, a front end edge 17r of the bottom face 17j is curved so as to depress a central portion thereof. The closing portion 16d of the upper case 16 is formed as a curved face which expands outward. A tip edge 16e of the closing portion 16d is provided so as to protrude outward, and curved.

In the state of fitting the upper case 16 and the lower case 17 together, an opening is formed on a lower end of a casing 18. The opening is disposed as a spindle shape between the tip edge 16e of the closing portion 16d and the front end edge 17r of the bottom face 17j. The opening constitutes a free cabling hole 26 to pass wire harnesses connected to opponent connectors.

As similar to the first embodiment, the cutaway portion for exposing the fuse outlet 11e is formed on the lower case 17. Hence, even when the junction box body 14 is housed in the lower case 17 horizontally, fuses 23 can be readily changed through the cutaway portion only by detaching the upper case 16. Further, the cutaway portion is covered with the closing portion 16d, whereby entrance of dust into the casing 18 can be prevented.

Connectors 11f and a substrate connector 44 of the junction box body 14 are coupled with opponent connectors. Then, wire harnesses to be connected to the opponent connectors need to be drawn out of the casing 18. As shown in FIG. 14, the wire harnesses W/H are passed through the free cabling hole 26 provided on the lower end of the casing 18. The free cabling hole 26 is widely open across the entire width of the casing 18. Thus, a cabling path for the wire harnesses W/H can be readily changed to the left or to the right depending on the specifications of a vehicle. In FIG. 14, a wire harness W/H illustrated with a full solid line shows a case of a right-hand drive vehicle, and a wire harness W/H illustrated with a chain double-dashed line shows a case of a left-hand drive vehicle.

Therefore, one type of the casing 18 can accommodate with different specifications of vehicles such as the right-hand drive vehicle or the left-hand drive vehicle, so that one type of molds is sufficient for formation of the casing 18. As a result, regarding the junction box 10a, manufacturing costs of the casing 18 can be reduced, thereby providing the casing 18 at low costs.

Accordingly, one type of the casing 18 can accommodate with the different specifications of vehicles such as the right-hand drive vehicle or the left-hand drive vehicle. As a result, it is possible to reduce the manufacturing costs of the casing, and to provide the casing 18 at low costs.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A junction box comprising:
   a junction box body including a fuse outlet for fitting fuses, the junction box body comprising:
      a first cover provided with an embedding stage for various external electronic components;
      a second cover to be fitted to the first cover;
      a wiring plate disposed between the second cover and the first cover;
      a wiring board disposed between the wiring plate and the first cover, the wiring board being fixed to the wiring plate and stacked in multiple stages, and the wiring board having an insulating plate; and
      a control substrate including a substrate, the control substrate being fixed on the wiring plate, and
   a casing for housing the junction box body, the casing comprising:
      a first case including a cutaway portion and a housing hole for housing the junction box body; and
      a second case for detachably covering the housing hole of the first case, the second case including a closing portion,
   wherein the cutaway portion is configured to expose the fuse outlet therethrough when the junction box body is housed in the housing hole of the first case and the second case is detached from the first case, and
   wherein the closing portion is configured to cover the cutaway portion when the second case is attached to the first case.

2. The junction box according to claim 1,
   wherein the junction box body includes a connector outlet for fitting an external connector, and the casing includes a free cabling hole for allowing a wire harness connected to the external connector to be extracted in an arbitrary direction.

3. The junction box according to claim 1,
   wherein the control substrate includes a terminal block, and
   wherein the terminal block includes a first divided block and a second divided block, and adjacent ends of both the first divided block and the second divided block constitute a superimposed portion.

4. The junction box according to claim 3,
wherein the control substrate further includes a substrate connector provided independently of both the substrate and the terminal block.

5. The junction box according to claim 3,
wherein the terminal block is provided substantially orthogonal to a plane direction of the insulating plate.

6. The junction box according to claim 5,
wherein the terminal block is fastened and fixed to the wiring plate with a screw when the substrate is mounted on the wiring plate.

7. The junction box according to claim 3,
wherein the substrate is disposed on the wiring plate in an erected state, and the terminal block is provided substantially orthogonal to a plane direction of the substrate.

8. The junction box according to claim 1, wherein the wiring plate has a rectangular shape and is made of a hard resin, and a plurality of cabling paths having electric wires cabled thereon are formed on a back surface of the wiring plate.

9. The junction box according to claim 1, wherein the first cover includes an expanded portion and the control substrate includes a power unit and a control unit, and wherein a heat-shielding partition wall for shielding between the power unit and the control unit is provided in the expanded portion.

* * * * *